United States Patent
Ballard (10) Patent No.: US 8,432,905 B2
(45) Date of Patent: Apr. 30, 2013

(54) GEOGRAPHIC REDUNDANCY AT SESSION BORDER CONTROLLERS BASED ON HOST NAME SCHEMES

(75) Inventor: Stephen Ray Ballard, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 319 days.

(21) Appl. No.: 12/715,676

(22) Filed: Mar. 2, 2010

(65) Prior Publication Data

US 2011/0216767 A1    Sep. 8, 2011

(51) Int. Cl.
*H04L 12/28* (2006.01)

(52) U.S. Cl.
USPC .......................................... 370/389; 370/392

(58) Field of Classification Search .................. 370/352, 370/349, 389, 395.2, 392, 471; 709/245, 709/203, 221
See application file for complete search history.

(56) References Cited

U.S. PATENT DOCUMENTS

| | | | |
|---|---|---|---|
| 7,653,747 B2* | 1/2010 | Lucco et al. .................. | 709/245 |
| 2006/0212599 A1* | 9/2006 | Lucco et al. .................. | 709/245 |
| 2006/0258358 A1* | 11/2006 | Kallio .......................... | 455/437 |
| 2007/0081541 A1* | 4/2007 | Umekage et al. .......... | 370/395.2 |
| 2008/0062997 A1* | 3/2008 | Nix ............................. | 370/395.2 |
| 2011/0026516 A1* | 2/2011 | Roberts et al. ............... | 370/352 |
| 2011/0078229 A1* | 3/2011 | Qiu et al. ..................... | 709/203 |

* cited by examiner

*Primary Examiner* — Hassan Phillips
*Assistant Examiner* — Ajay Cattungal (57) ABSTRACT

A method including provisioning geographically redundant network devices with a shared host name or provisioning each of geographically redundant network devices with multiple host names in correspondence to each geographically redundant network device, wherein one of the multiple host names include a primary host name associated with one of the geographically redundant network devices and one or more secondary host names associated with the other geographically redundant network devices; receiving one or more packets; inspecting one or more headers associated with the one or more packets; determining a host name based on the one or more headers inspected; rewriting the one or more headers to include the shared host name or one of the multiple host names; and forwarding the one or more packets to another device.

20 Claims, 8 Drawing Sheets

GEOGRAPHIC REDUNDANCY AT SESSION BORDER CONTROLLERS BASED ON HOST NAME SCHEMES

BACKGROUND

Network operators and service providers offer various services to their customers. For example, in today's communication networks, providing Internet Protocol (IP)-based communication sessions, such as voice, multimedia, etc., has become pervasive. In case of network failures, it is not uncommon for alternate or backup systems to exist so that loss-of-service to customers is minimized.

Carrier-side application servers (ASs) can include access lists that are used to provision access. For example, an access list may include carrier-side domain-to-customer device level mappings. Unfortunately, configuration limitations associated with the access list may limit the number of host names to which end devices may be mapped, to a single host name.

Given the above, the access list may prevent customers from benefiting from geographic redundancy. For example, carrier-side session border controllers (SBCs) are each assigned unique host names. When a communication session is redirected to an alternate or backup SBC due to a network failure or some other reason, the AS may reject the communication session due to the configuration limitations of the access list.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term "packets," as used herein, is intended to be broadly interpreted to include a data transmission. By way of example, but not limited thereto, a packet may take the form of an IP datagram, a cell, a frame, a packet, etc., or a portion thereof.

The term "host name," as used herein, is intended to be broadly interpreted to include a string that identifies a device. The string may include a variety of numeric, alphabetic, or alphanumeric sequence of characters.

The term "geographically redundant network device," as used herein, is intended to be broadly interpreted to include a network device that provides redundant services, functions, etc., with respect to other network devices in the event of a failure, etc. Additionally, a geographically redundant network device resides in a locale that is sufficiently separated from other geographically redundant network devices.

According to exemplary embodiments described herein, geographic redundancy is provided based on a shared host name scheme and/or a multiple host name scheme. According to an exemplary implementation, carrier-side geographic redundancy is provided even when a carrier-side AS includes configuration limitations, which limit the number of host names to which end devices may be mapped, to a single host name.

According to an exemplary embodiment, geographic redundancy is provided based on geographically redundant network devices sharing a common host name. By way of example, but not limited thereto, the network devices may correspond to geographically redundant SBCs. According to an exemplary implementation, one or more customer sites including end devices may access a carrier-side AS via geographically redundant SBCs. When an SBC receives packets, the SBC may rewrite customer side domain headers into carrier-side domain headers. According to an exemplary implementation, the host name associated with the SBC may be the same host name as the host name of other geographically redundant SBC(s). According to such an implementation, regardless of whether the packets have been redirected or not to the SBC, the AS may accept the packets and provide the service, function, and/or asset to the customers and end devices. According to the exemplary embodiment, since the SBCs are provisioned with the same host name, end device IDs may be provisioned to be unique.

According to another exemplary embodiment, geographic redundancy is provided on geographically redundant network devices having multiple host names. By way of example, but not limited thereto, the network devices may correspond to geographically redundant SBCs. According to an exemplary implementation, one or more customer sites including end devices may access a carrier-side AS via geographically redundant SBCs. When an SBC receives packets, the SBC may rewrite customer side domain headers into carrier-side domain headers. According to an exemplary implementation of the embodiment, the SBC may be provisioned with multiple host names. The multiple host names may include the host names associated with the respective geographically redundant SBCs.

When the packets received originate from a customer site or an end device in which the SBC is mapped as the primary SBC, the SBC may utilize the host name assigned to it. Conversely, when the packets received originate from a customer site or an end device in which the SBC is mapped as a secondary or an alternate SBC, the SBC may utilize the host name associated with another geographically redundant SBC (i.e., the host name associated with the primary SBC). According to this exemplary embodiment, since the SBCs are provisioned with unique host names, end device IDs may or may not be provisioned uniquely.

Figure 1A:
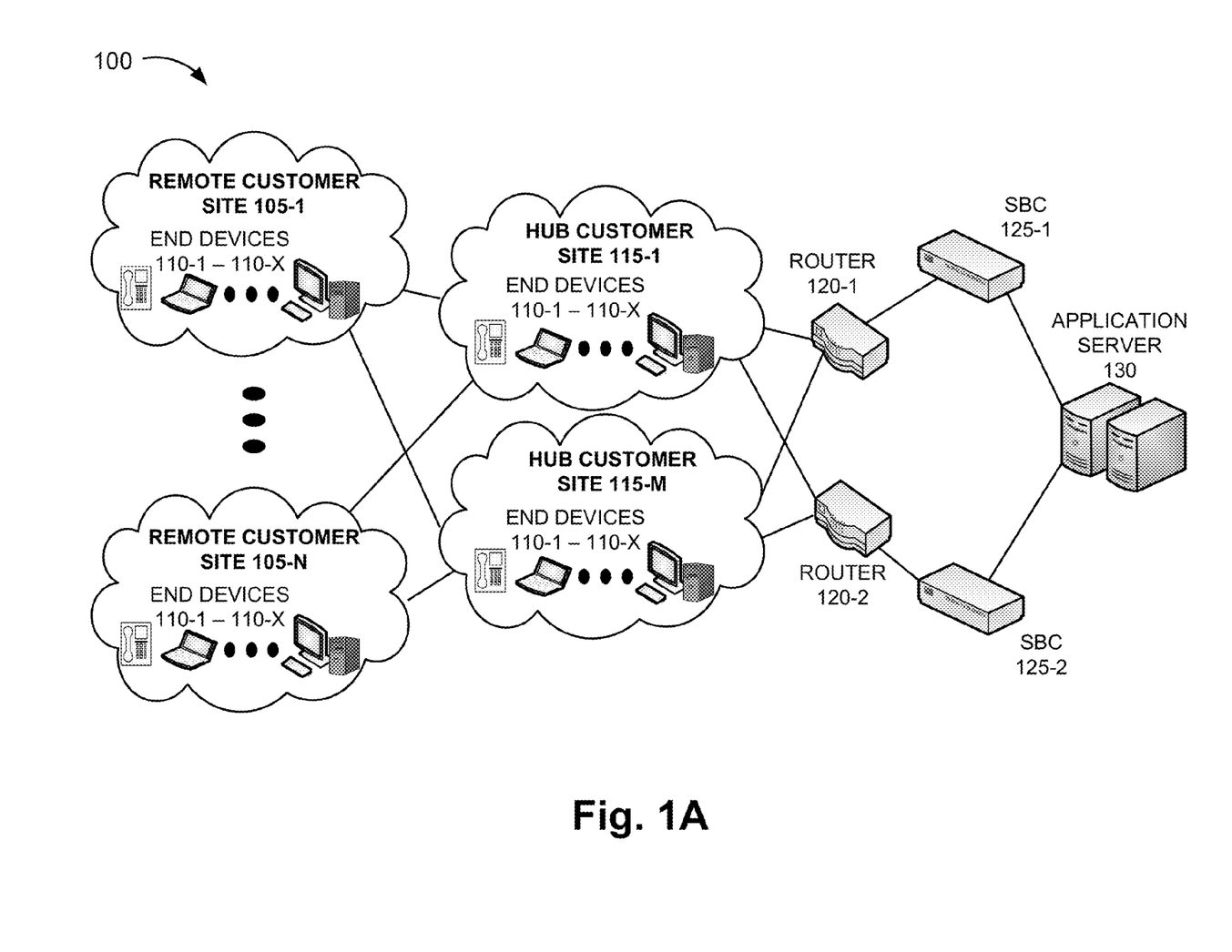
FIGS. 1A-1C are diagrams illustrating an exemplary environment in which geographic redundancy based on network devices sharing a common host name and/or having multiple host names may be implemented.

FIG. 1A is a diagram illustrating an exemplary environment 100 in which geographic redundancy based on network devices sharing a common host name and/or having multiple host names may be implemented. For ease of description, the network devices are described as SBCs. However, in other implementations, the network devices may correspond to a different type of network device (e.g., a gateway, an edge device, etc.).

As illustrated in FIG. 1A, environment 100 may include remote customer sites 105-1 through 105-N (referred to generally as remote customer sites 105 or remote customer site 105), which may include end devices (EDs) 110-1 through 110-X (referred to generally as EDs 110 or ED 110), hub customer sites 115-1 through 115-M (referred to generally as hub customer sites 115 or hub customer site 115), which may include EDs 110, routers 120-1 and 120-2 (referred to generally as routers 120 or router 120), SBCs 125-1 and 125-2 (referred to generally as SBCs 125 or SBC 125), and AS 130.

The number of devices, the number of customer sites, and configuration in environment 100 is exemplary and provided for simplicity. In practice, environment 100 may include more devices, fewer devices, different devices, and/or differently arranged devices, as well as additional customer sites, or fewer customer sites than those illustrated in FIG. 1A. By way of example, but not limited thereto, environment 100 may include other types of network devices, such as gateways, switches, servers, security devices, etc., intermediary networks, etc. Also, some functions described as being performed by a particular device may be performed by a different device or a combination of devices.

Figure 1B:
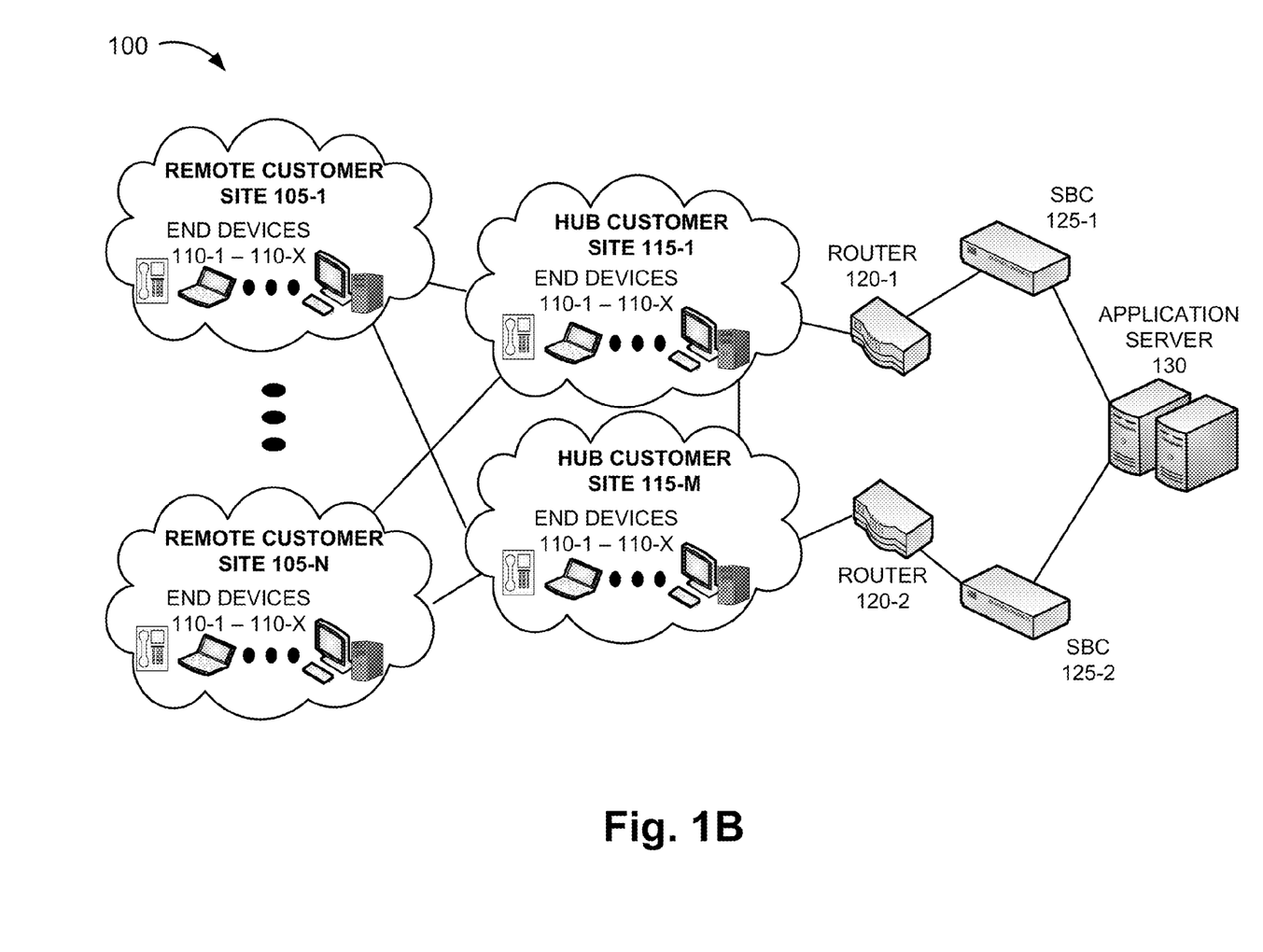
Figure 1C:
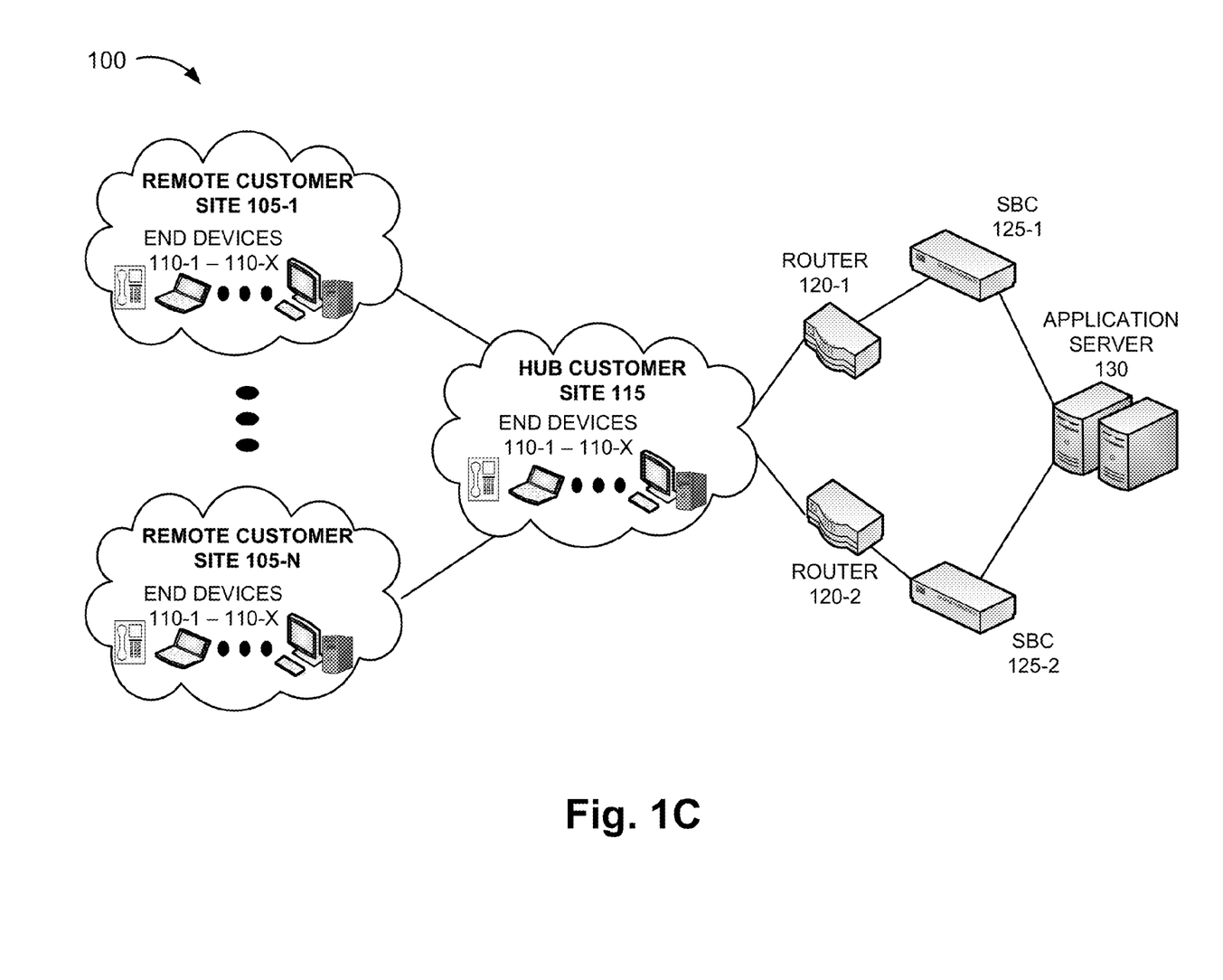

Environment 100 may include wired and/or wireless connections among the devices illustrated. The connections between devices and customer sites illustrated in environment 100 are exemplary and provided for simplicity. In practice, environment 100 may include additional connections, fewer connections and/or different connections than those illustrated in FIG. 1A. By way of example, but not limited thereto, environment 100 may include a connection between hub customer sites 115, as illustrated in FIG. 1B, or may include a single hub customer site 115, as illustrated in FIG. 1C. It will be appreciated, however, that other variations are possible.

Remote customer site 105 and hub customer site 115 may correspond to customer premises. ED 110 may include a device having the capability to communicate with other devices, systems, networks, and/or the like. By way of example, but not limited thereto, ED 110 may include an IP telephone, a wireless telephone (e.g., a cellular telephone, etc.), a computer (e.g., a laptop, a desktop, a palmtop, etc.), a personal digital assistant (PDA), a personal communication system (PCS) terminal, a pervasive computing device, and/or some other type of portable device, mobile device, handheld device, stationary device, and/or vehicle-based device.

Router 120 may include a device having the capability to communicate with other devices, systems, networks, and/or the like. Router 120 may forward and/or route packets.

SBC 125 may include a device having the capability to communicate with other devices, systems, networks, and/or the like. SBC 125 may control signaling and media streams associated with services, functions, and/or assets (e.g., information) provided to remote customer sites 105 and hub customer sites 115. By way of example, but not limited thereto, the media streams may include Voice over IP (VoIP) and/or other types of interactive media communications. SBC 125 may operate according to a variety of protocols, including but not limited to Session Initiation Protocol (SIP), H.323, and Media Gateway Control Protocol (MGCP).

SBC 125 may be host name provisioned according to one or more embodiments described herein. For example, as previously described according to an exemplary embodiment, SBC 125 may be provisioned to share a common host name with one or more other SBCs 125. According to such a configuration, EDs 110 may be provisioned with unique line IDs and/or some other type of provisioning may be implemented to maintain uniqueness at a customer ED level. Additionally, or alternatively, as previously described according to another exemplary embodiment, SBC 125 may be provisioned with multiple host names. According to such a configuration, EDs 110 may or may not be provisioned with unique line IDs. By way of example, and with reference to FIG. 1A, EDs 110 of remote customer site 105-1 may share overlapping line IDs with EDs 110 of remote customer site 105-N. SBC 125 will be described in greater detail below.

AS 130 may include a device having the capability to communicate with other devices, systems, networks, and/or the like. AS 130 may provide one or more services and/or assets to customers. By way of example, but not limited thereto, AS 130 may provide VoIP services and/or other types of interactive media communications. AS 130 may include configuration limitations that limit host name provisioning associated with EDs 110 of remote customer site 105 or hub customer site 115 to a single host name. In other words, AS may accept packets from EDs 110 of remote customer site 105 or hub customer site 115 via SBC 125 provided the host name associated with SBC 125 matches the host name provisioned on AS 130. By way of example, but not limited thereto, AS 130 may include a Broadsoft AS 130. For carrier-side ASs 130 that include additional access list criteria, such as IP address and port number, than these additional values may need to be explicitly allowed in ASs 130 if SBCs 125 are not permitted to map or change them.

Figure 1D:
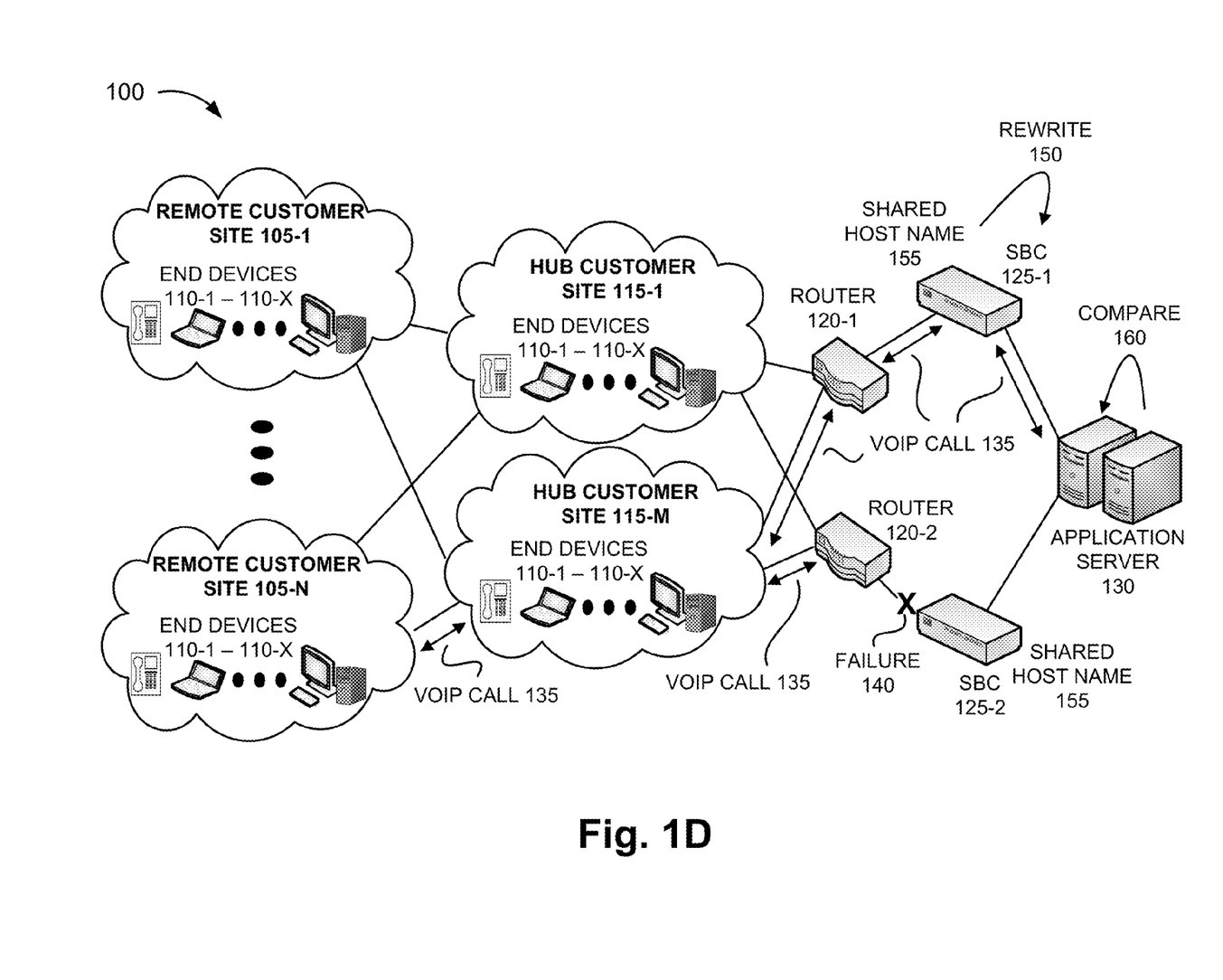
FIG. 1D is a diagram illustrating exemplary operations associated with an exemplary implementation of geographic redundancy based on SBCs sharing a common host name.

FIG. 1D is a diagram illustrating exemplary operations associated with an exemplary implementation of geographic redundancy based on SBCs sharing a common host name. Referring to FIG. 1D, it may be assumed that a VoIP call 135 is initiated from ED 110 of remote customer site 105-N, which propagates to router 120-2 via hub customer site 115-M. Router 120-2 may be unsuccessful in forwarding VoIP call 135 to SBC 125-2 due to a failure 140 (e.g., a link failure). In response to failure 140, hub customer site 115-M may forward VoIP call 135 to SBC 125-1 via router 120-1.

Upon receipt of VoIP call 135, SBC 125-1 may inspect header information. SBC 125-1 may rewrite 150 headers associated with VoIP call 135 before sending VoIP call 135 to AS 130. By way of example, but not limited thereto, it may be assumed that the VoIP call 135 includes SIP packets. When SBC 125-1 receives a SIP packet, SBC 125-1 may rewrite 150 a P-Asserted Identity header field, a Remote Party ID header field, and/or a From header field, to changes these header fields from a customer side domain into a fully qualified domain name (FQDN) that includes a shared host name 155. The FQDN may be used to identify an IP address or an IP address and port number on SBC 125-1 that can be mapped back to an ED 110. According to an exemplary embodiment, the host name (i.e., shared host name 155) is shared with at least one other geographically redundant SBC (e.g., SBC 125-2). SBC 125-1 may forward the SIP packet having the rewritten header fields to AS 130.

It may be assumed that AS 130 is provisioned to communicate with shared host name 155. Upon receipt of the SIP packet, AS 130 may inspect the header field(s) to determine whether to accept or reject the SIP packet. By way of example, but not limited thereto, AS 130 may access an access list and compare 160 the header field(s) to the access list to determine whether the header field(s) is/are valid. In this case, since the header field(s) is/are rewritten so that the FQDN includes shared host name 155, AS 130 will accept the SIP packet. This is in contrast to other approaches in which SBCs 125 are assigned unique host names. According to such approaches, when SIP packets are sent to AS 130 via a secondary or alternate SBC 125 (e.g., SBC 125-1), AS 130 rejects the SIP packets since AS 130 permits only a single customer-to-carrier domain name mapping. In other words, AS 130 will not accept the same line ID associated with ED 110 from different SBCs 125 having different host names.

While FIG. 1D illustrates exemplary operations associated with an implementation of geographic redundancy based on SBCs sharing a common host name, geographic redundancy may be implemented based on other scenarios. By way of example, in the absence of failure 140, SBC 125-2 may perform operations analogous to those described with respect to SBC 125-1 in that header information associated with the SIP packet may be rewritten so that the FQDN includes shared host name 155.

Figure 1E:
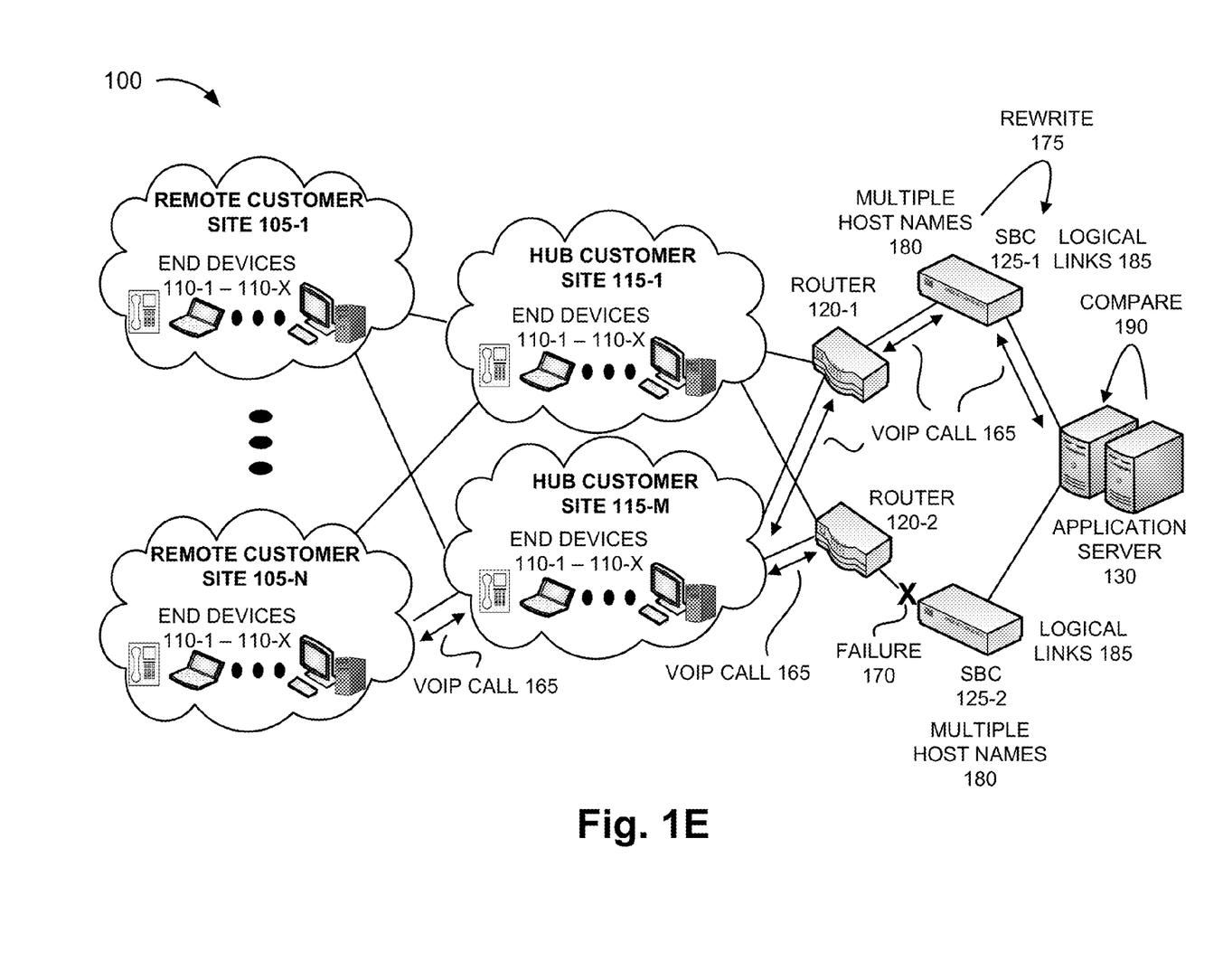
FIG. 1E is a diagram illustrating exemplary operations associated with an exemplary implementation of geographic redundancy based on SBCs having multiple host names.

FIG. 1E is a diagram illustrating exemplary operations associated with an exemplary implementation of geographic redundancy based on SBCs having multiple host names. Referring to FIG. 1E, it may be assumed that a VoIP call 165 is initiated from ED 110 of remote customer site 105-N, which propagates to router 120-2 via hub customer site 115-M. Router 120-2 may be unsuccessful in forwarding VoIP call 165 to SBC 125-2 due to a failure 170 (e.g., a link failure). In response to failure 170, hub customer site 115-M may forward VoIP call 165 to SBC 125-1 via router 120-1.

Upon receipt of VoIP call 165, SBC 125-1 may inspect header information. SBC 125-1 may rewrite 175 headers associated with VoIP call 165 before sending VoIP call 165 to AS 130. By way of example, but not limited thereto, it may be assumed that the VoIP call 165 includes SIP packets. When SBC 125-1 receives a SIP packet, SBC 125-1 may rewrite 175 a P-Asserted Identity header field, a Remote Party ID header field, and/or a From header field, to changes these header fields from a customer side domain into an FQDN that includes a host name associated with multiple host names 180. According to an exemplary embodiment, multiple host names 180 may include unique host names that correspond to the geographically redundant SBCs 125. In this exemplary case, multiple host names 180 may include a unique host name associated with SBC 125-1 and a unique host name associated with SBC 125-2.

According to multiple host names provisioning, SBC 125-1 may select the appropriate unique host name. Depending on the network connections between router 120-1 and SBC 125-1, SBC 125-1 may receive VoIP call 165 (e.g., SIP packets) on a particular physical link and/or a particular logical link. By way of example, but not limited thereto, inbound logical links 185 may exist that permit SBC 125-1 to select the appropriate host name. For example, it may be assumed that logical links 185 include a logical link A and a logical link B. SBC 125-1 may utilize logical link A for SIP packets that are received from customer sites in which SBC 125-1 is the primary SBC and SBC 125-1 may utilize logical link B for SIP packets that are received from customer sites in which SBC 125-1 is the secondary SBC. According to this exemplary scenario, SBC 125-1 may select the unique host name associated with SBC 125-2 since VoIP call 165 has been redirected to SBC 125-1 due to failure 170. Conversely, if SBC 125-1 receives another VoIP call 165 that has not been redirected, SBC 125-1 may select the unique host name associated with SBC 125-1. According to this framework, SBCs 125-1 and 125-2 may mirror each other (i.e., by host name) when SBCs 125-1 and 125-2 receive communications from customer sites that are not mapped to them as primary customer sites.

After SBC 125-1 rewrites 175 the header information, SBC 125-1 may forward the SIP packet having the rewritten header fields to AS 130. Depending on the network connections between SBC 125-1 and AS 130, SBC 125-1 may forward VoIP call 165 (e.g., the SIP packets) on a particular physical link and/or a particular logical link. By way of example, outbound logical links 185 may exist that permit SBC 125-1 to select the appropriate logical link (e.g., logical link B). SBC 125-1 may forward the SIP packet on logical link B. SBC 125-2 may be similarly configured.

Upon receipt of the SIP packet, AS 130 may inspect the header field(s) to determine whether to accept or reject the SIP packet. By way of example, but not limited thereto, AS 130 may access an access list and compare 190 the header field(s) to the access list to determine whether the header field(s) is/are valid. In this case, since the header field(s) is/are rewritten so that the FQDN includes the host name of SBC 125-2, AS 130 will accept the SIP packet. This is in contrast to other approaches in which SBCs 125 would utilize its own unique host name, which would cause AS 130 to reject the SIP packet since AS 130 will not accept the same line ID associated with ED 110 from different SBCs 125 having unique host names.

As a result of the foregoing, carrier-side geographic redundancy may be provided to customers even when a carrier-side AS includes configuration limitations, which limit the number of host names to which end devices may be mapped, to a single host name. Since exemplary embodiments have been broadly described, a more detailed description is provided below.

Figure 2:
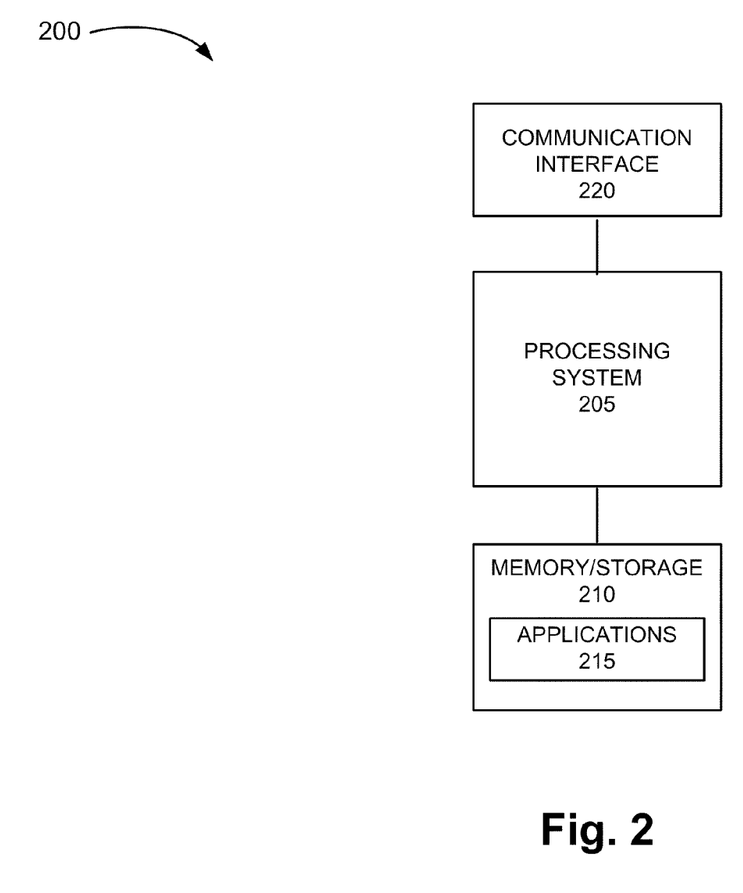
FIG. 2 is a diagram illustrating exemplary components of a device that may correspond to one or more of the devices in the environment of FIGS. 1A-1E.

FIG. 2 is a diagram illustrating exemplary components of a device 200 that may correspond to one or more of the devices in environment 100. For example, device 200 may correspond to ED 110, router 120, SBC 125, and/or AS 130. As illustrated, device 200 may include a processing system 205, memory/storage 210 including applications 215, and a communication interface 220. In other implementations, device 200 may include fewer components, additional components, different components, and/or a different arrangement of components than those illustrated in FIG. 2 and described herein.

Processing system 205 may include one or more processors, microprocessors, data processors, co-processors, application specific integrated circuits (ASICs), controllers, programmable logic devices, chipsets, field programmable gate arrays (FPGAs), or some other component that may interpret and/or execute instructions and/or data. Processing system 205 may control the overall operation, or a portion thereof, of device 200, based on, for example, an operating system and/or various applications (e.g., applications 215).

Memory/storage 210 may include one or more memories and/or one or more secondary storages. For example, memory/storage 210 may include a random access memory (RAM), a dynamic random access memory (DRAM), a read only memory (ROM), a programmable read only memory (PROM), a flash memory, and/or some other type of memory. Memory/storage 210 may include a hard disk (e.g., a magnetic disk, an optical disk, a magneto-optic disk, a solid state disk, etc.) or some other type of computer-readable medium, along with a corresponding drive. Memory/storage 210 may include a memory, a storage device, or storage component that is external to and/or removable from device 200, such as, for example, a Universal Serial Bus (USB) memory stick, a hard disk, mass storage, off-line storage, etc.

The term "computer-readable medium," as used herein, is intended to be broadly interpreted to include, for example, a memory, a storage device (e.g., a hard disk and corresponding drive), a compact disc (CD), a digital versatile disc (DVD), or the like. The computer-readable medium may be implemented in a single device, in multiple devices, in a centralized manner, or in a distributed manner. Memory/storage 210 may store data, application(s), and/or instructions related to the operation of device 200.

Applications 215 may include software that provides various services or functions. By way of example, but not limited thereto, with reference to SBC 125, applications 215 may include one or more applications for managing customer-side domain to carrier-side domain mappings according to the shared host name scheme and/or multiple host names scheme, as described herein. By way of example, but not limited thereto, with reference to AS 130, applications 215 may include one or more applications for providing one or more services and/or assets to customers.

Communication interface 220 may permit device 200 to communicate with other devices, networks, systems and/or the like. Communication interface 220 may include a wireless interface and/or wired interface.

As described herein, device 200 may perform operations in response to processing system 205 executing software instructions contained in a computer-readable medium, such as memory/storage 210. By way of example, but not limited thereto, the software instructions may be read into memory/storage 210 from another computer-readable medium or from another device via communication interface 220. The software instructions contained in memory/storage 210 may cause processing system 205 to perform processes described herein. Alternatively, hardwired circuitry may be used in place of or in combination with software instructions to implement processes described herein. Thus, implementations described herein are not limited to any specific combination of hardware circuitry and software.

As previously described, AS 130 may include configuration limitations, which limit the number of host names to which EDs 110 of remote customer site 105 or hub customer site 115 may be mapped, to a single host name. Described below are exemplary processes that may be performed to circumvent these configuration limitations and provide geographic redundancy to customers and EDs 110.

Figure 3:
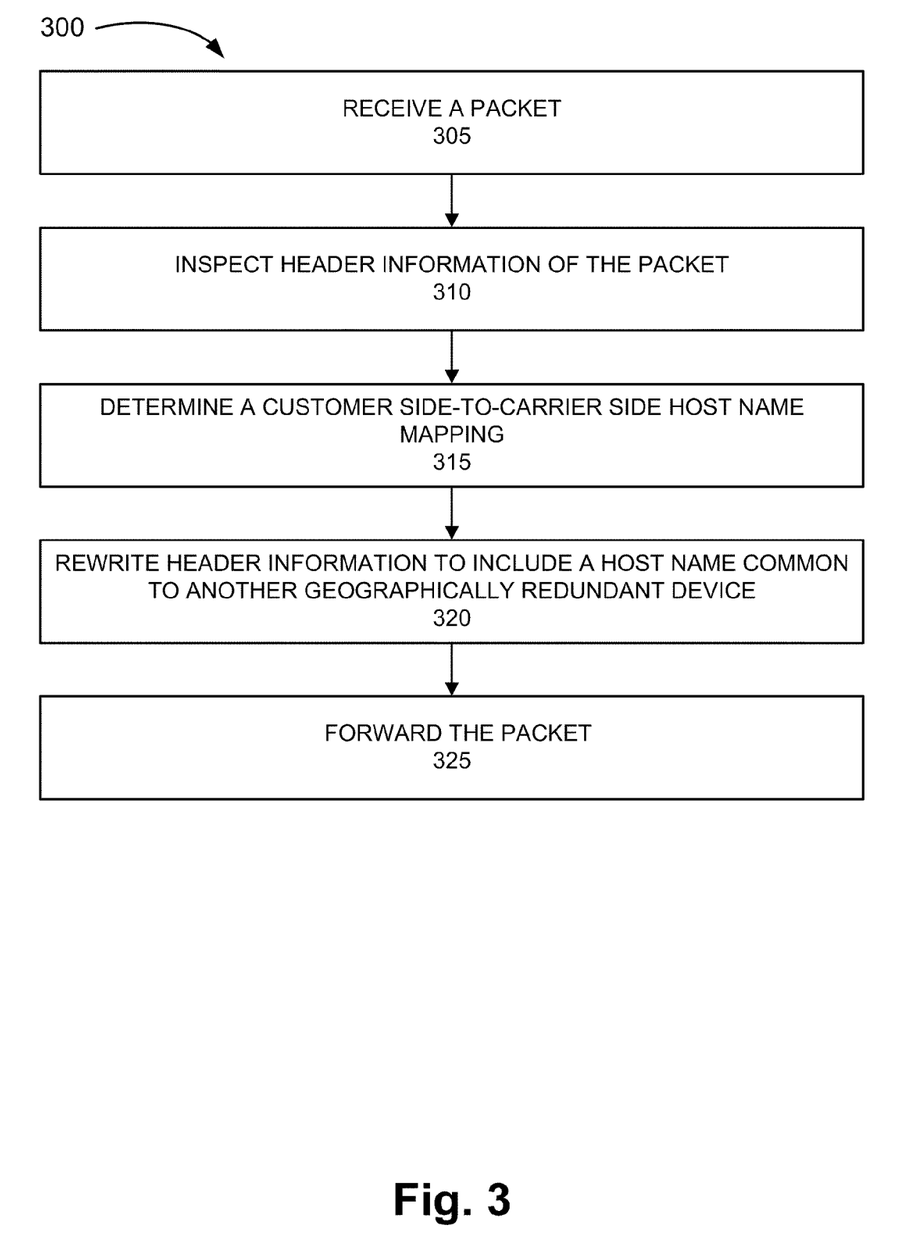
FIG. 3 is a flow diagram illustrating an exemplary process for providing geographic redundancy based on a shared host name scheme.

FIG. 3 is a flow diagram illustrating an exemplary process 300 for providing geographic redundancy based on a shared host name scheme. According to an exemplary implementation, process 300 may be performed by SBC 125. In other implementations, process 300 may be performed by some other type of network device (e.g., a gateway, an edge device, etc.).

Process 300 may include receiving a packet (block 305). By way of example, but not limited thereto, a packet, such as a SIP packet, may be received by SBC 125. According to an exemplary scenario, the packet may originate from an ED 110 associated with a customer site (e.g., remote customer site 105 or hub customer site 115) and may be destined to AS 130 via SBC 125. The packet may traverse a redirected communication path or a normal communication path to SBC 125.

Header information of the packet may be inspected (block 310). SBC 125 may inspect header fields associated with the received packet. According to an exemplary implementation, the header fields may correspond to at least one of a P-Asserted Identity header field, a Remote Party ID header field, or a From header field.

A customer side-to-carrier side host name mapping may be determined (block 315). For example, SBC 125 may determine an appropriate carrier-side host name mapping based on the header field(s) inspected. By way of example, a line ID associated with ED 110 and/or a customer domain may be mapped to a carrier-side host name that is associated with SBCs 125 to provide geographic redundancy.

According to an exemplary implementation, as previously described, geographically redundant SBCs 125 may be assigned a shared host name. SBC 125 may determine to utilize the shared host name based on the header fields inspected.

Header information that includes a host name common to another geographically redundant device may be rewritten (block 320). For example, SBC 125 may rewrite the header information to correspond to the appropriate carrier-side host name. By way of example, SBC 125 may rewrite the P-Asserted Identity header field, the Remote Party ID header field and/or the From header field to include the host name common to or shared with another geographically redundant SBC 125.

The packet may be forwarded (block 325). SBC 125 may forward the packet having the rewritten header fields to AS 130. AS 130 may accept the packet and provide the service and/or asset to ED 110.

Although FIG. 3 illustrates an exemplary process 300 for providing geographic redundancy based on the shared host name scheme, in other implementations, process 300 may include additional operations, fewer operations, and/or different operations than those illustrated in FIG. 3.

Figure 4:
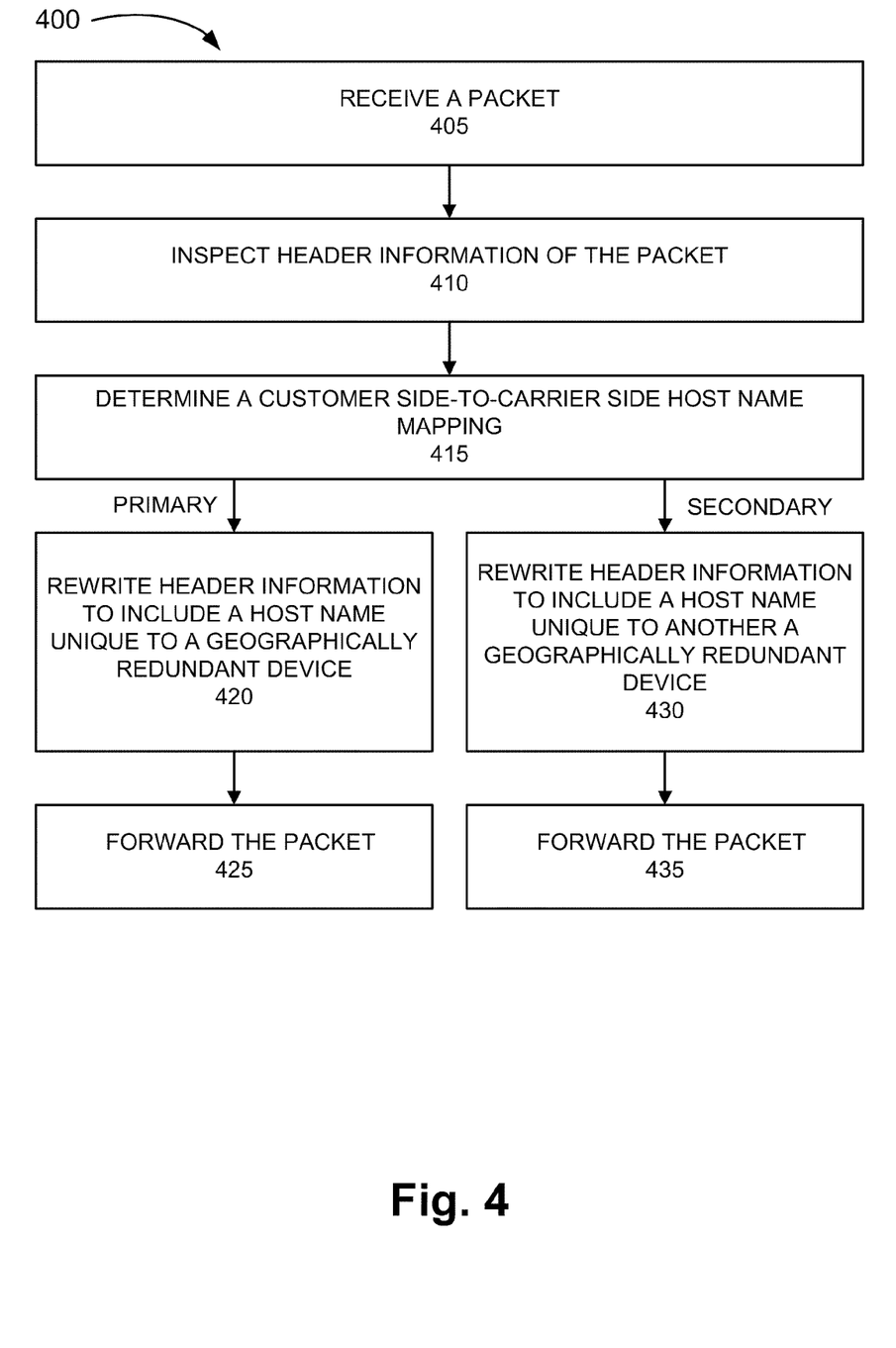
FIG. 4 is a flow diagram illustrating an exemplary process for providing geographic redundancy based on a multiple host names scheme.

FIG. 4 is a flow diagram illustrating an exemplary process 400 for providing geographic redundancy based on multiple host names scheme. According to an exemplary implementation, process 400 may be performed by SBC 125. In other implementations, process 400 may be performed by some other type of network device (e.g., a gateway, an edge device, etc.).

Process 400 may include receiving a packet (block 405). By way of example, but not limited thereto, the packet, such as a SIP packet, may be received by SBC 125. According to an exemplary scenario, the packet may originate from an ED 110 associated with a customer site (e.g., remote customer site 105 or hub customer site 115) and may be destined to AS 130 via SBC 125. The packet may traverse a redirected communication path or a normal communication path to SBC 125.

Header information of the packet may be inspected (block 410). For example, SBC 125 may inspect header fields associated with the received packet. According to an exemplary implementation, the header fields may correspond to at least one of a P-Asserted Identity header field, a Remote Party ID header field or a From header field.

A customer side-to-carrier side host name mapping may be determined (block 415). For example, SBC 125 may determine an appropriate carrier-side host name mapping based on the header field(s) inspected. By way of example, a line ID associated with ED 110 and/or a customer domain may be mapped to a carrier-side host name that is associated with SBCs 125 to provide geographic redundancy.

According to an exemplary implementation, as previously described, geographically redundant SBCs 125 may be assigned multiple host names in which multiple host names may include unique host names associated with respective geographically redundant SBCs. For example, SBC 125-1 may be provisioned with a unique host name (e.g., SBC-A) associated with itself and another unique host name (e.g., SBC-B) associated with SBC 125-2.

According to an exemplary implementation, SBC 125 may determine which host name of the multiple host names to select based on the header field(s) inspected. By way of example, as previously described, SBC 125 may be mapped as a primary SBC for customer sites (e.g., remote customer site 105, hub customer site 115) and EDs 110, while SBC 125 may be mapped as a secondary SBC for other customer sites and other EDs 110. In instances when the packet originates from a customer site or ED 110 in which SBC 125 is mapped as the primary SBC, SBC 125 may select the unique host name associated with itself. Conversely, in instances when the packet originates from a customer site or ED 110 in which SBC 125 is mapped as the secondary SBC, SBC 125 may select the unique host name associated with another geographically redundant SBC 125.

As described below, blocks 420 and 425 correspond to the instance when the packet originates from a customer site or ED 110 in which SBC 125 is mapped as the primary SBC, and blocks 430 and 435 correspond to the instance when the packet originates from a customer site or ED 110 in which SBC 125 is mapped as the secondary SBC.

Header information to include a host name unique to a geographically redundant device may be rewritten (block 420). For example, SBC 125 may rewrite the header information to correspond to the appropriate carrier-side host name. By way of example, SBC 125 may rewrite the P-Asserted Identity header field, the Remote Party ID header field and/or the From header field to include the host name assigned to SBC 125. That is, the host name corresponds to the unique host name associated with itself since SBC 125 is considered the primary SBC.

The packet may be forwarded (block 425). SBC 125 may forward the packet having the rewritten header fields to AS 130. According to an exemplary implementation, the packet may be forwarded on a logical link corresponding to when SBC 125 is mapped as the primary SBC. AS 130 may accept the packet and provide the service and/or asset to ED 110.

Header information to include a host name unique to another geographically redundant device may be rewritten (block 430). For example, SBC 125 may rewrite the header information to correspond to the appropriate carrier-side host name. By way of example, SBC 125 may rewrite the P-Asserted Identity header field, the Remote Party ID header field and/or the From header field to include the host name assigned to another geographically redundant SBC 125 since SBC 125 is considered the secondary SBC.

The packet may be forwarded (block 435). SBC 125 may forward the packet having the rewritten header fields to AS 130. According to an exemplary implementation, the packet may be forwarded on a logical link corresponding to when SBC 125 is mapped as the secondary SBC. AS 130 may accept the packet and provide the service and/or asset to ED 110.

Although FIG. 4 illustrates an exemplary process 400 for providing geographic redundancy based on the multiple host names scheme, in other implementations, process 400 may include additional operations, fewer operations, and/or different operations than those illustrated in FIG. 4.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 3 and 4, the order of the blocks may be modified in other implementations. Further, non-dependent blocks may be performed in parallel.

It will be apparent that the embodiments described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the devices and/or systems, or the performing of the methods was described without reference to the specific software code—it being understood that software and control hardware can be designed to implement the device, method, and/or system based on the description herein.

Further certain features described above may be implemented as "logic" or a "component" that performs one or more functions. This logic or component may include hardware, such as one or more processors, one or more microprocessors, one or more ASICs, one or more FPGAs, etc., a combination of hardware and software, or a combination with firmware, etc.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction used in the present application should be construed as critical or essential to the implementations described herein unless explicitly described as such.

What is claimed is:

1. A method comprising:
   storing, by geographically redundant network devices, a shared host name that identifies the geographically redundant network devices;
   storing, by each geographically redundant network device, an unshared host name that identifies each geographically redundant network device, respectively;
   receiving, by one of the geographically redundant network devices, one or more packets;
   determining, by the one of the geographically redundant network devices, a host name mapping for the one or more packets, based on at least one of a link on which the one or more packets are received, a user identifier associated with a user device from which the one or more packets originate, or a network domain associated with the user device;
   rewriting, by the one of the geographically redundant network devices, the one or more packets to include the shared host name corresponding to the host name mapping; and
   forwarding the one or more packets to another device.

2. The method of claim 1, further comprising:
   inspecting one or more header fields associated with the one or more packets; and
   wherein the determining is based on the one or more header fields inspected.

3. The method of claim 2, wherein the rewriting comprises:
   rewriting the one or more header fields to include the shared host name, and wherein the one or more header fields correspond to at least one of a P-Asserted Identity header field, a Remote Party ID header field, or a From header field.

4. The method of claim 1, wherein the geographically redundant network devices correspond to session border controllers and the other device corresponds to an application server.

5. The method of claim 4, wherein the host name mapping corresponds to a customer domain to a carrier side mapping.

6. A method comprising:
   storing, by each of geographically redundant network devices, multiple host names that identify each geographically redundant network device, wherein one of the multiple host names include a primary host name associated with one of the geographically redundant network devices and a remainder of the multiple host names include one or more secondary host names associated with the other one or more geographically redundant network devices;
   receiving, by the one of the geographically redundant network devices, one or more packets;
   determining, by the one of the geographically redundant network devices, a host name mapping for the one or more packets based on at least one of a link on which the one or more packets are received, a user identifier associated with an end device from which the one or more packets originate, or a network domain associated with the end device;
   rewriting, by the one of the geographically redundant network devices, the one or more packets to include one of the multiple host names corresponding to the host name mapping; and
   forwarding the one or more packets to another device.

7. The method of claim 6, wherein the geographically redundant network devices correspond to session border controllers and the other device corresponds to an application server.

8. The method of claim 7, wherein the determining comprises:
   determining whether the one or more packets originate from an end device in which the one of the geographically redundant network devices is a primary session border controller in relation to the end device; and
   selecting the primary host name when the one or more packets originate from the end device in which the one of the geographically redundant network devices is the primary session border controller.

9. The method of claim 7, wherein the determining comprises:
   determining whether the one or more packets originate from an end device in which the one of the geographically redundant network devices is a secondary session border controller in relation to the end device; and
   selecting one of the one or more secondary host names when the one or more packets originate from the end device in which the one of the geographically redundant network devices is a secondary session border controller.

10. The method of claim 9, wherein the rewriting comprises:
    rewriting one or more header fields associated with the one or more packets to include the one of the one or more secondary host names, wherein the one or more header fields correspond to at least one of a P-Asserted Identity header field, a Remote Party ID header field, or a From header field.

11. A network device comprising:
    a communication interface;
    a memory to store instructions; and
    a processor to execute the instructions to:
       store a host name mapping that includes a host name shared with at least one other network device, wherein the network device provides geographic redundancy relative to the at least one other network device;
       store another host name that identifies the network device and is not shared with the at least one other network device;
       receive, via the communication interface, one or more packets originating from an end device;
       inspect one or more headers associated with the one or more packets;
       determine whether the host name shared with the at least one other network device is to be utilized based on the one or more headers inspected and at least one of a link on which the one or more packets are received, a user identifier associated with the end device from which the one or more packets originate, or a network domain associated with the end device;
       rewrite the one or more headers to include the host name in response to a determination that the host name is to be utilized; and
       transmit, via the communication interface, the one or more packets to the other device.

12. The network device of claim 11, wherein the network device comprises a session border controller.

13. The network device of claim 12, wherein the session border controller is mapped as a primary session border controller in relation to the end device or the session border controller is mapped as a secondary border controller in relation to the end device.

14. The network device of claim 11, wherein the one or more headers correspond to at least one of a P-Asserted Identity header field, a Remote Party ID header field, or a From header field.

15. The network device of claim 14, wherein the processor executes the instructions to:
    generate a fully qualified domain name that includes the host name; and
    determine whether the one or more packets have been redirected.

16. A network device comprising:
    a communication interface;
    a memory to store instructions; and
    a processor to execute the instructions to:
       store a host name mapping scheme that include multiple host names corresponding to the network device and one or more other network devices, wherein one of the multiple host names includes a primary host name associated with the network device and a remainder of the multiple host names includes one or more secondary host names corresponding to the one or more other network devices, wherein the multiple host names includes multiple fully qualified domain names;
       receive, via the communication interface, one or more packets originating from an end device;
       inspect one or more headers associated with the one or more packets;
       determine whether the primary host name or one of the one or more secondary host names is to be utilized based on the one or more headers inspected;
       rewrite the one or more headers to include the primary host name in response to a determination that the one or more packets originate from the end device in which the network device is a primary network device;
       rewrite the one or more headers to include one of the one or more secondary host names in response to a determination that the one or more packets originate from the end device in which the network device is a secondary network device; and transmit, via the communication interface, the one or more packets to another device.

17. The network device of claim 16, wherein the network device comprises a session border controller.

18. The network device of claim 16, wherein the one or more headers correspond to at least one of a P-Asserted Identity header field, a Remote Party ID header field, or a From header field.

19. The network device of claim 16, wherein the host name mapping corresponds to a customer domain to a carrier side mapping scheme.

20. The network device of claim 16, wherein the processor executes the instructions to:
  generate a first fully qualified domain name that includes the primary host name, or
  generate a second fully qualified name that includes the one of the one or more secondary host names.

* * * * *